Aug. 9, 1927.  
R. F. RUNGE  
1,638,747  
HANGER BOX  
Filed June 26, 1923
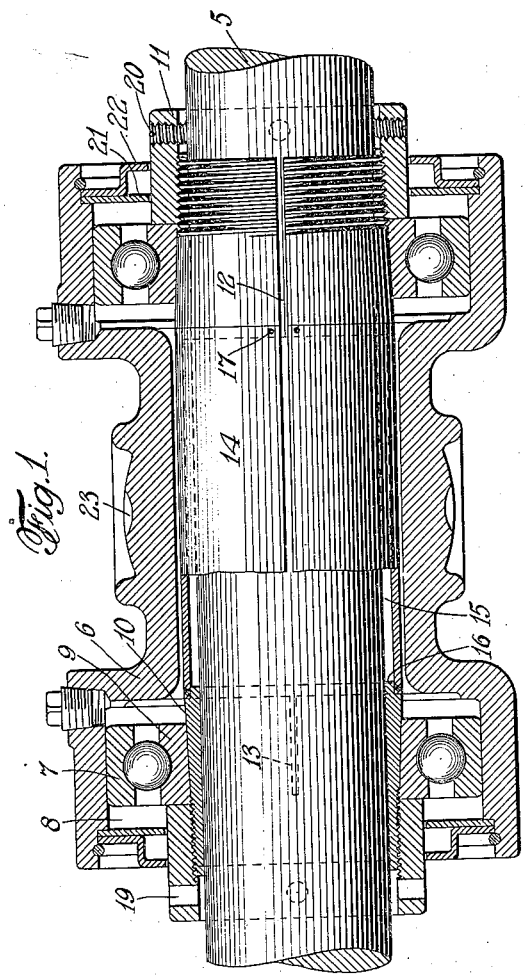
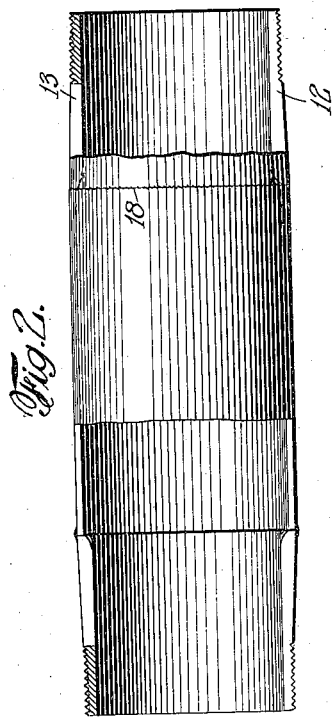
Inventor  
Robert F. Runge,  
By his Attorneys,  
Rogers, Kennedy & Campbell.

Patented Aug. 9, 1927.

1,638,747

UNITED STATES PATENT OFFICE.

ROBERT F. RUNGE, OF FOREST HILLS, NEW YORK, ASSIGNOR TO THE SKAYEF BALL BEARING COMPANY, A CORPORATION OF CONNECTICUT.

HANGER BOX.

Application filed June 26, 1923. Serial No. 647,806.

The invention relates to anti-friction bearing mountings and to double adapter sleeves.

The principal object sought to be attained by this invention is to properly and permanently space apart a pair of preformed adapter sleeves, each constructed to receive the inner ring of a ball bearing, in such manner that the sleeves are capable of individual compression, each without relation to the compression of the other, the separating device or spacer sleeve being connected to these compressible or adapter sleeves in such manner that their freedom of action, or the freedom of action of either of them, is not impaired.

A further object of the invention is to connect a pair of adapter sleeves for ball or roller bearings for a shaft hanger box or other box, by electrically welding the parts together.

The specific adaptation of the invention shown in the illustration is for use in connection with a lineshaft bearing which is sometimes known as a lineshaft hanger box. It is also adapted for use in pillow blocks and in loose pulleys.

Figure 1 of the accompanying drawing is a view partly in longitudinal section and partly in elevation showing one practicable embodiment of my invention made up in the form of a lineshaft bearing, and Fig. 2 is a similar view showing another form of union between the separator or spacer and a pair of adapter sleeves, the sleeves and separator being shown turned angularly a distance of about 90° from the position illustrated in Figure 1.

In mounting anti-friction bearings, and particularly ball bearings upon lineshafting and other shafts along which the bearing has to be moved for a considerable distance, and particularly those situations in which it is not commercially feasible to reduce the shaft to the nice tolerances required for the usual press fit which the inner ring of a ball bearing has upon its shaft, it has been quite common practice to employ the adapter type bearing in which the bore of the inner ring of the bearing is slightly tapered for riding up on the tapered portion of the compressible adapter. Difficulty has frequently been experienced when a pair of ball bearings were required to be mounted in spaced relationship within a housing. In the illustration I have shown an efficient means for positioning and spacing apart a pair of adapter sleeves and also as a major combination such spaced apart sleeves assembled into a casing constituting, as a self-contained handling unit, a lineshaft hanger. A broken away piece of lineshafting designated by the reference character, 5, is shown mounted in the hanger box, 6. This hanger box is intended to be supported by a hanger or pedestal according to some convenient or well-known practice as may be desirable. At each end of the structure is shown a single row deep-groove ball bearing, the outer race rings, 7, of which are mounted within the housings 8, formed at the ends of the casing, 6, and preferably having a nice sucking fit in such housings. The inner ring, 9, of each of these adapter type bearings, is formed with a tapered bore and is mounted upon an adapter sleeve, 10. Except for the features of my invention presently to be described the ball bearings and adapter sleeves shown in the illustration are of the prevailing type used for this class of work. At the smaller end of the conical sleeve, 10, there is a screw threaded extension, 11, upon which is mounted a nut, 12, for engaging the outer face of the inner ring, 9, of the ball bearing and forcing this up on the taper of the sleeve. These sleeves are shown slotted so that they may be readily compressed and clamp the shaft. They are generally slotted from end to end, as at 12, the slot running through the sleeve proper and the screw threaded extension, 11, and also have a shorter slot, as 13, stopping at about the place where the screw thread begins.

In mounting a structure such as above described in which there are two ball bearings each mounted upon a tapered adapter sleeve, it has heretofore been found difficult to keep one or both of the bearings in proper position upon the shaft and each in proper relative position to the other. It is to be borne in mind that this work is done by millwrights working frequently under very unfavorable conditions for accurate work. The bearings are not mounted upon the lineshaft by a machinist working at his bench, but right out in the factory, sometimes on the floor and sometimes with the shaft suspended by a pulley in its approximate position. To make this mounting operation as simple and accurate as possible there have been many expedients proposed for spacing the adapter sleeves and through them appproximately spacing the bearings.

According to my invention I provide a split spacer sleeve or separator, 14, having longitudinal splits or interruptions corresponding with the slots, 12—13, in the adapter sleeve and electrically weld this spacer sleeve, 14, to the inner or larger ends of the preformed adapter sleeves. Preferably the wall of the spacer sleeve, 14, is much thinner than the larger ends of the adapter sleeves, so that having substantially the same outside diameter as such ends there nevertheless is provided free space, 15. The sleeve, 14, when thus formed, does not touch the shaft as the assembled structure is slid longitudinally over it in bringing the parts to their desired position. The inside diameter of the tube is preferably greater than the bore of the sleeves inwardly of the bearing seats, so as to form a clearance between the tube and shaft and permit the free compressibility of the sleeves at these regions inwardly of the bearing seats. This construction enables each sleeve to be clamped up tightly upon the shaft without the interference of the connected parts. The inner ends of the adapter sleeves are shown rabbeted, a portion, 16, of it underlying the separator or spacer sleeve, 14. This provides a convenient and accurate way for assembling the parts prior to welding, which may be of any suitable kind. In Figure 1, spot welding, illustrated by the dots, 17, has been resorted to. Butt welding in this rabbet may be employed, or if it is found more desirable in certain instances to butt weld the parts without recourse to the centering and positioning rabbet this may be done as illustrated at 18 in Figure 2.

At times it may be found expedient to make the spacer sleeves, 14, from tubing, splitting this through on each side, but when the device is made in large quantities of given sizes the sleeves of the separator are formed from sheet metal which is sheared and struck into the desired shape of segments of a hollow cylinder, slightly less than 180°.

The outer ends of the lock nuts, 11, are shown extending beyond the ends of the box or housing, 6, and provided with spanner holes, 19, and quartering with the spanner holes, tapped holes for receiving set screws, 20. The spanner holes and set screws are shown located outwardly of the plates, 21—22. These plates form a labyrinth, the central opening coming adjacent the outside diameter of the nuts, 11, forms a grease chamber for the adjacent ball bearing, and also protection from dust and foreign matter. When the device is made up in the factory it will be assembled with grease of sufficient hardness not to leak to any appreciable extent through the slots in the adapter sleeves. The device then constitutes a self-contained handling unit which can be shipped to the point of application and there mounted upon the lineshaft or other shaft without the necessity of opening the housings and exposing the bearings.

The assembled structure should be slid along the shaft until support engaging portions of the box or housing, as for instance the depressions, 23, come in line with the support, as for instance the set screws of the lineshaft hanger, whereupon the millwright will engage the tow nuts, 11, with spanners and screw these nuts in, which will cause the inner races, 9, of the ball bearings to ride up on the larger portions of the adapter sleeves, 10, causing each of these sleeves to be compressed and tightly clamp the shaft. The limited amount of axial or lateral movement of the outer rings within the housing, 8, permits this movement of the inner rings over the adapter sleeves and also permits a certain amount of adjustment of the box longitudinally of the shaft to accommodate any minor inaccuracies of position.

It is to be understood that the device shown in the drawing is illustrative of my invention, and that changes may be made within the scope of the claims without departing from the spirit of the invention.

I claim as my invention:

1. The combination with a pair of bearing adapter sleeves each having a bore for fitting a shaft, a tapered seat for receiving a bearing, and a screw threaded extension, the tapered portion having one or more slots for facilitating compressibility, and a tube integrally connected to the sleeves at their larger ends, such tube having slots registering with the slots in the sleeves, the inside diameter of the tube being greater than the bore of the sleeves inwardly of the bearing seats so as to form a clearance between the tube and shaft and permit the free compressibility of the sleeves at the regions of the seats.

2. The combination with a pair of conical adapter sleeves each being slotted longitudinally and having a screw threaded extension at the smaller end of the cone, a tube having slots registering with the slots in the adapter sleeves, the inside diameter of the tube being greater than the inside diameter of the sleeves so as to form a clearance between the tube and shaft upon which the structure is mounted, the outer face of the adapter sleeve being rabbeted at the larger end for receiving the end of the tubing, and the end of the tube resting in the rabbet and abutting the inwardly facing shoulder formed by the rabbet whereby the tendency for inward movement of the adapter sleeves incident to the inward movement of the bearings is resisted by the tube taking the pressure longitudinally, and the tubing being welded thereto, of a bearing having a tapered bore mounted on each of the said adapter sleeves, a box having a pair of outwardly facing housings wherein the bearings are respectively mounted, a closure for each of the housings having a central opening, and nuts mounted on the screw threaded extensions and projecting outwardly through such openings.

3. An article of manufacture, a shaft mounting for a pair of bearings comprising two conical adapter sleeves each being slotted longitudinally and having a screw threaded extension at the smaller end of the cone, a tube integrally connected with the sleeves at the larger ends of the cones and having slots registering with the slots in the adapter sleeves, the inside diameter of the tube being greater than the inside diameter of the sleeves so as to form a clearance between the tube and shaft upon which the sleeves are mounted.

4. An article of manufacture, a shaft mounting for a pair of bearings comprising two conical adapter sleeves each being slotted longitudinally and having a screw threaded extension at the smaller end of the cone, a tube integrally connected with the sleeves at the larger ends of the cones and having slots registering with the slots in the adapter sleeves, the inside diameter of the tube being greater than the inside diameter of the sleeves so as to form a clearance between the tube and shaft upon which the sleeves are mounted, the outer face of the adapter sleeve being rabbeted at the larger end for receiving the end of the tubing, and the tubing being welded thereto.

5. An article of manufacture, a shaft mounting for a pair of bearings comprising two conical adapter sleeves each being slotted longitudinally and having a screw threaded extension at the smaller end of the cone, a tube integrally connected with the sleeves at the larger ends of the cones and having slots registering with the slots in the adapter sleeves, the inside diameter of the tube being greater than the inside diameter of the sleeves so as to form a clearance between the tube and shaft upon which the sleeves are mounted, the outer face of the adapter sleeve being rabbeted at the larger end, the end of the tube resting in the rabbet and abutting the inwardly facing shoulder formed by the rabbet whereby the tendency for inward movement of the adapter sleeves incident to the inward movement of the bearings is resisted by the tube taking the pressure longitudinally.

In testimony whereof, I have affixed my signature hereto.

ROBERT F. RUNGE.